(12) United States Patent
Singhal et al.

(10) Patent No.: US 12,093,144 B1
(45) Date of Patent: Sep. 17, 2024

(54) METHOD AND SYSTEM FOR PERFORMING CROSS PLATFORM RESTORATION OPERATIONS

(71) Applicant: Dell Products L.P., Round Rock, TX (US)

(72) Inventors: Upanshu Singhal, Bangalore (IN);
Sreeman Sunku, Bangalore (IN);
Hema Basavaraju, Bangalore (IN);
Anju Singisetty, Bangalore (IN);
Aaditya Rakesh, Bathinda (IN)

(73) Assignee: Dell Products, L.P., Round Rock, TX (US)

( * ) Notice: Subject to any disclaimer, the term of this patent is extended or adjusted under 35 U.S.C. 154(b) by 43 days.

(21) Appl. No.: 18/305,700

(22) Filed: Apr. 24, 2023

(51) Int. Cl.
*G06F 11/08* (2006.01)
*G06F 11/14* (2006.01)

(52) U.S. Cl.
CPC ...... *G06F 11/1469* (2013.01); *G06F 11/1451* (2013.01); *G06F 11/1464* (2013.01)

(58) Field of Classification Search
CPC ............ G06F 11/1469; G06F 11/1451; G06F 11/1464
USPC .................................................. 714/6.3, 4.11
See application file for complete search history.

(56) References Cited

U.S. PATENT DOCUMENTS

| | | | |
|---|---|---|---|
| 2003/0079155 A1* | 4/2003 | Kingsbury | G06F 11/0709 714/2 |
| 2011/0196842 A1* | 8/2011 | Timashev | G06F 11/1469 707/679 |
| 2017/0235950 A1* | 8/2017 | Gopalapura Venkatesh | G06F 3/0689 726/24 |
| 2017/0329593 A1* | 11/2017 | McMullen | G06F 11/1433 |
| 2020/0326867 A1* | 10/2020 | Tibrewal | G06F 3/0623 |
| 2022/0043719 A1* | 2/2022 | Chopra | G06F 11/1461 |
| 2022/0342779 A1* | 10/2022 | Minarik | G06F 11/3409 |

* cited by examiner

*Primary Examiner* — Chae M Ko
(74) *Attorney, Agent, or Firm* — Chamberlain, Hrdlicka, White, Williams & Aughtry; Aly Z. Dossa

(57) ABSTRACT

Techniques described herein relate to a method for performing data protection services. The method includes identifying a restoration event associated with an network attached storage (NAS) asset stored in a backup storage; obtaining backup information associated with the NAS asset; making a determination that the restoration is associated with cross platform restoration; and in response to the determination; identifying an available cross platform host of a multi-platform host environment (MPHE) using host information; and initiating restoration of the NAS asset using the cross platform host.

20 Claims, 8 Drawing Sheets

METHOD AND SYSTEM FOR PERFORMING CROSS PLATFORM RESTORATION OPERATIONS

BACKGROUND

Computing devices may provide services for users. To provide the services, the computing devices may generate data. The data may be used to import to one or more users. Therefore the data may be backed up to generate backups. The backups may be used to restore lost or corrupt data. The data may be transferred from one computing device to another during backup generation and restoration operations.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
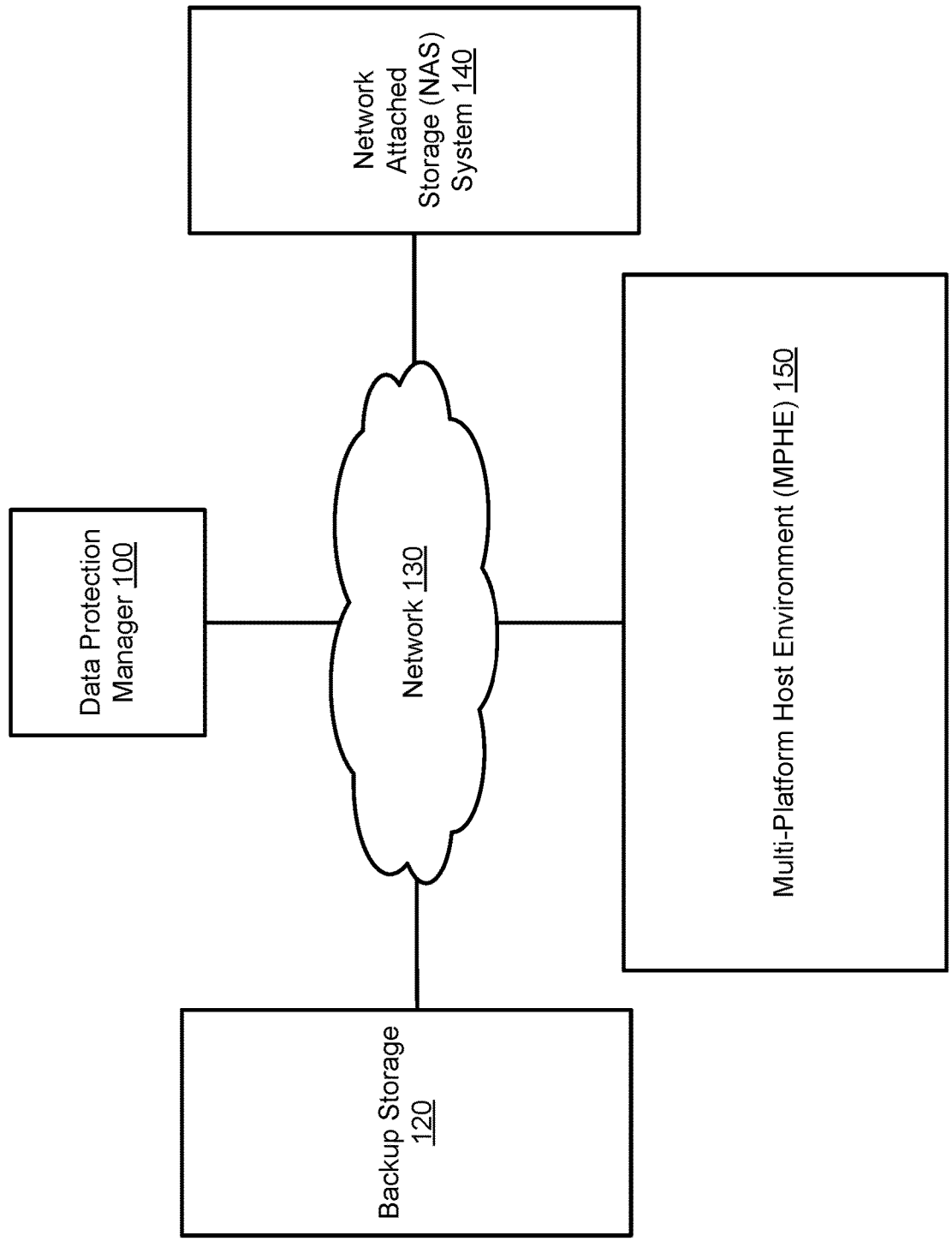
FIG. 1A shows a diagram of a system in accordance with one or more embodiments disclosed herein.

Specific embodiments will now be described with reference to the accompanying figures. In the following description, numerous details are set forth as examples of the embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Data protection managers may provide a solution to perform Network Attached Storage (NAS) file system backups of a NAS asset using a specific operating system based computing device (e.g., a Linux based computing device) for Network File System (NFS), Server Message Block (SMB), and/or Common Internet File System (CIFS) shares. An OS based backup host (e.g., a computing device) may include the functionality to backup any NAS asset out of any type of NAS node through any type of protocol such as NFS and SMB. In one or more embodiments, a backup of these shares may include the file data and file metadata (e.g., file permissions, attributes, extended attributes, access control lists (ACLs), etc.). The backups may include other types of information without departing from embodiments disclosed herein. A user may restore the files and their attributes from the same type of OS based computing device in the event of any data loss. These backups may be restored as a complete share or as a file level recovery (FLR) along with the attributes and ACLs associated with the backups.

In some scenarios, a user may be unable to restore some files or folders if the file or folders names are too long (e.g., greater than 255 bytes) or include non-English characters. This may usually happen with SMB or CIFS type shares. This may result in a data loss or data unavailability scenario. In other scenarios, a user may need to wait for the availability of a particular OS based computing device to recover their data for production or testing purposes. As such, there is no existing method or technology to automatically perform a cross platform restore of data, i.e. a restoration using a backup generated from one platform (e.g., Linux) and performing the restore using another platform (e.g., Windows). There may be some manual methods to perform a cross platform restore; however these methods may include a very lengthy and tedious restoration process.

Embodiments disclosed herein relate to systems, methods, and non-transitory computer readable mediums for restoring NAS data across platforms. For example, embodiments disclosed herein may relate to using a backup from a first OS based backup computing device to restore the corresponding data using a second, different OS based computing device.

FIG. 1A shows a diagram of a system in accordance with one or more embodiments disclosed herein. The system may include a data protection manager (100), a backup storage (120), a network attached storage system (NAS) (140), and a multi-platform host environment (MPHE) (150). The components of the system illustrated in FIG. 1A may be operatively connected to each other and/or operatively connected to other entities (not shown) via the network (130).

The network (130) may include any combination of wired (e.g., Ethernet) and/or wireless networks (e.g., local area network, wide area network, Internet, etc.) without departing from embodiments disclosed herein. Each component of the system illustrated in FIG. 1A is discussed below.

In one or more embodiments, the data protection manager (100) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the data protection manager (100) described herein and/or all, or a portion, of the methods illustrated in FIGS. 2A-2C. The data protection manager (100) may be implemented using other types of computing devices without departing from the embodiments disclosed herein. For additional details regarding computing devices, refer to FIG. 3.

The data protection manager (100) may be implemented using logical devices without departing from the embodiments disclosed herein. For example, the data protection manager (100) may include virtual machines that utilize computing resources of any number of physical computing devices to provide the functionality of the data protection manager (100). The data protection manager (100) may be implemented using other types of logical devices without departing from the embodiments disclosed herein.

In one or more embodiments, the data protection manager (100) may include the functionality to, or otherwise be programmed or configured to, perform data protection management services for data or assets stored in the NAS system (140) using backup storage (120) and the MPHE (150). The data protection manager (100) may include the functionality to perform all, or a portion of, the methods discussed in FIGS. 2A-2C. The data protection manager (100) may include other and/or additional functionalities without departing from embodiments disclosed herein. For additional information regarding the functionality of the data protection manager (100), refer to FIGS. 2A-2C. For additional information regarding the data protection manager (100), refer to FIG. 1D.

In one or more embodiments, the backup storage (120) may be implemented using one or more computing devices. A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIGS. 2A-2C. The backup storage (120) may be implemented using other types of computing devices without departing from embodiments disclosed herein. For additional details regarding computing devices, refer to FIG. 3.

In one or more embodiments, the backup storage (120) may be implemented using logical devices without departing from embodiments disclosed herein. For example, the backup storage (120) may include virtual machines that utilize computing resources of any number of physical computing devices to provide the functionality of the backup storage (120). The backup storage (120) may be implemented using other types of logical devices without departing from the embodiments disclosed herein.

In one or more embodiments, the backup storage (120) may include the functionality to, or may be otherwise programmed or configured to, store and provide backups of NAS assets or shares. Accordingly, the backup storage (120) may obtain backups from hosts of the MPHE (150) during backup operations and may provide backups or portions of backups to hosts of the MPHE (150) during restorations of assets of the NAS system (140). The backup storage (120) may include the functionality to perform all, or a portion, of the methods of FIG. 2A-2C. The backup storage (120) may include other and/or additional functionalities without departing from embodiments disclosed herein.

In one or more embodiments, the NAS system (140) may be implemented using one or more computing devices. A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIGS. 2A-2C. The NAS system (140) may be implemented using other types of computing devices without departing from embodiments disclosed herein. For additional details regarding computing devices, refer to FIG. 3.

In one or more embodiments, the NAS system (140) may be implemented using logical devices without departing from embodiments disclosed herein. For example, the NAS system (140) may include virtual machines that utilize computing resources of any number of physical computing devices to provide the functionality of the NAS system (140). The NAS system (140) may be implemented using other types of logical devices without departing from the embodiments disclosed herein.

In one or more embodiments, the NAS system (140) may include the functionality to, or may be otherwise programmed or configured to, service requests issued by entities not shown in FIG. 1A (e.g., applications executing on a production host). The NAS system (140) may service the requests by accessing or otherwise obtaining data from NAS assets stored in NAS nodes (discussed below in FIG. 2) of the NAS system (140). The NAS system (140) may further include functionality for storing data provided from entities not shown in FIG. 1A (e.g., applications executing on a production host). The NAS system (140) may include the functionality to perform all, or a portion, of the methods in FIGS. 2A-2C. The NAS system (140) may include other and/or additional functionalities without departing from embodiments disclosed herein.

To provide the aforementioned functionalities, the NAS system (140) may include a NAS load distribution component (not shown), one or more NAS nodes (not shown), and one or more network interfaces (not shown).

In one or more embodiments, the NAS load distribution component includes functionality for distributing workloads among the NAS nodes. For example, the NAS load distribution component obtains the service requests from the applications (e.g., via the network (130) and performs load balancing processes to determine the NAS node(s) to execute at least a portion of the service requests. The load balancing processes may base the determinations on, for example, (i) the workload of each NAS node, (ii) the storage locations of data associated with the service requests, and (iii) the computing capabilities of the NAS nodes.

Figure 3:
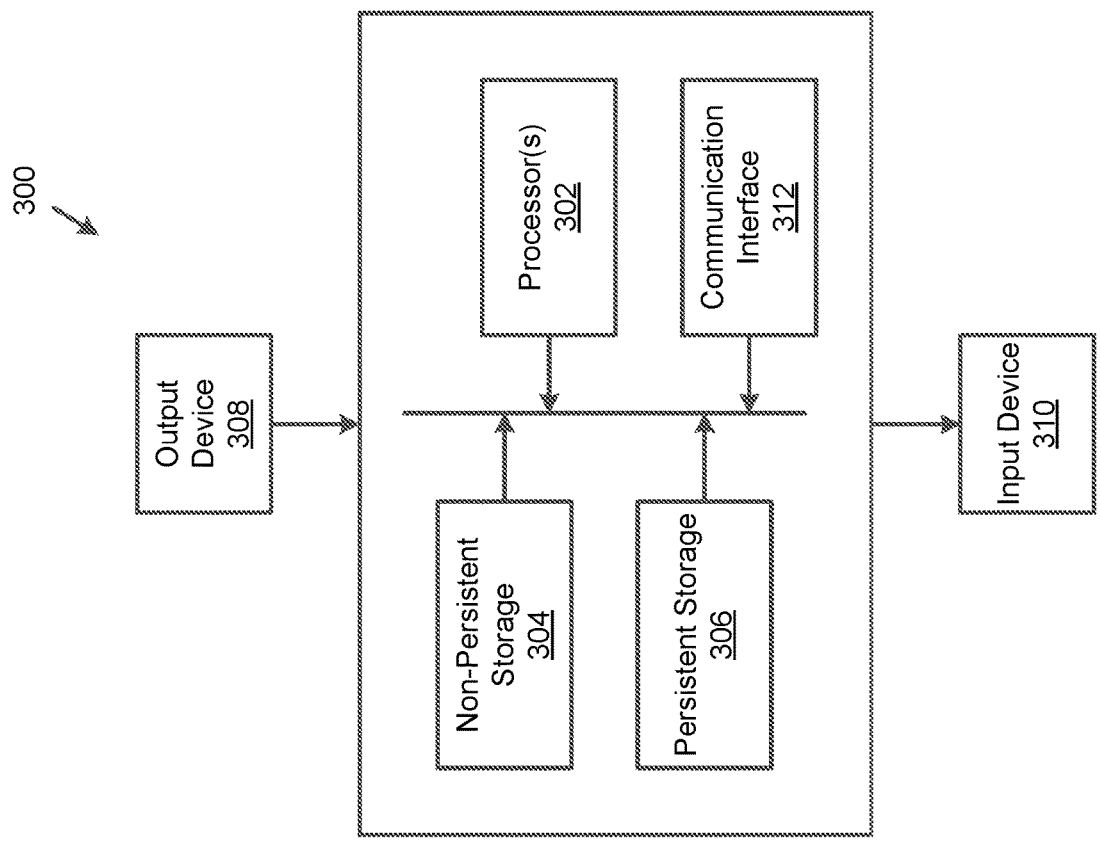
FIG. 3 shows a diagram of a computing device in accordance with one or more embodiments disclosed herein.

In one or more embodiments, the NAS load distribution component is each implemented as a computing device (see e.g., FIG. 3). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the NAS load distribution component described throughout this application.

In one or more embodiments of the invention, the NAS load distribution component is implemented as a logical device. The logical device may utilize the computing resources of any number of computing devices and thereby provide the functionality of the NAS load distribution component described throughout this application.

In one or more embodiments of the invention, the NAS nodes each include functionality for servicing service requests associated with NAS assets stored in the NAS nodes. The NAS nodes may each store data associated with one or more NAS assets. The NAS nodes may further write and read the data from the storage locations of the NAS assets in response to the service requests.

In one or more embodiments, the NAS nodes may be grouped in accordance with access zones. In one or more embodiments, an access zone is a cluster of nodes that are grouped based on the corresponding network interface. For example, a cluster of NAS nodes may be accessed via a first access zone. A second example includes grouping a cluster of nodes on a second access zone based on a similarity of access of the network interfaces of the cluster of nodes.

In one or more embodiments of the invention, the nodes may serve as management servers. A management server stores the data of a NAS asset (e.g., a file system) in a NAS node that serves as a storage node. The NAS system (140) may include any number of storage devices and management servers. Each storage device includes functionality for storing application data, file data (e.g., data associated with a file system), and/or any other data without departing from the invention. The data stored in the NAS system (140) may be accessible via one of the network interfaces.

In one or more embodiments, the NAS node are each implemented as a computing device (see e.g., FIG. 3). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the NAS node described throughout this application.

In one or more embodiments of the invention, the NAS node are implemented as a logical device. The logical device may utilize the computing resources of any number of computing devices and thereby provide the functionality of the NAS node described throughout this application.

In one or more embodiments, the network interfaces include functionality for providing communication channels between components of the NAS system (140) (e.g., the NAS distribution component and the NAS nodes) and other components accessible via the network (130). The network interfaces may be grouped based on the capability (e.g., bandwidth) of the network interfaces. Specifically, the network interfaces may be grouped into management interfaces and data interfaces. In one or more embodiments, the management interfaces may include functionality for providing a lower bandwidth than that of the data interfaces. As such, it may be preferable to transmit large amounts of data (e.g., for backup operations) to and from the NAS system (140) via a data interface. In contrast, it may be preferable to transmit lower sized data such as service requests via the management interfaces.

In one or more embodiments, application data, file data, and/or other data may be grouped into NAS assets. In one or more embodiments, a NAS asset is a grouping of data blocks based on the organization of one or more file systems. For example, a NAS asset may include the data of all files in a file system. In another example, an NAS asset may include the data of multiple file systems. In another example, the NAS asset includes the data of one application. The data of the NAS assets may be stored in the NAS system (140).

In one or more embodiments, the multi-platform host environment (MPHE) (150) may include multiple hosts. Each host of the MPHE (150) may include the functionality to perform a backup operation for an NAS asset stored on an NAS node of the NAS system (140) to generate and store a NAS backup in the backup storage (120). Additionally, each host of the MPHE (150) may include the functionality to perform a restoration operation for an NAS asset using all, or a portion of an NAS backup stored in the backup storage (120). For additional information regarding the MPHE (150) refer to FIG. 1B.

Although the system of FIG. 1A is shown as having a certain number of components (e.g., 100, 120, 130, 140, 150), in other embodiments disclosed herein, the system may have more or fewer components. For example, the functionality of each component described above may be split across components or combined into a single component. Further still, each component may be utilized multiple times to carry out an iterative operation.

Figure 1B:
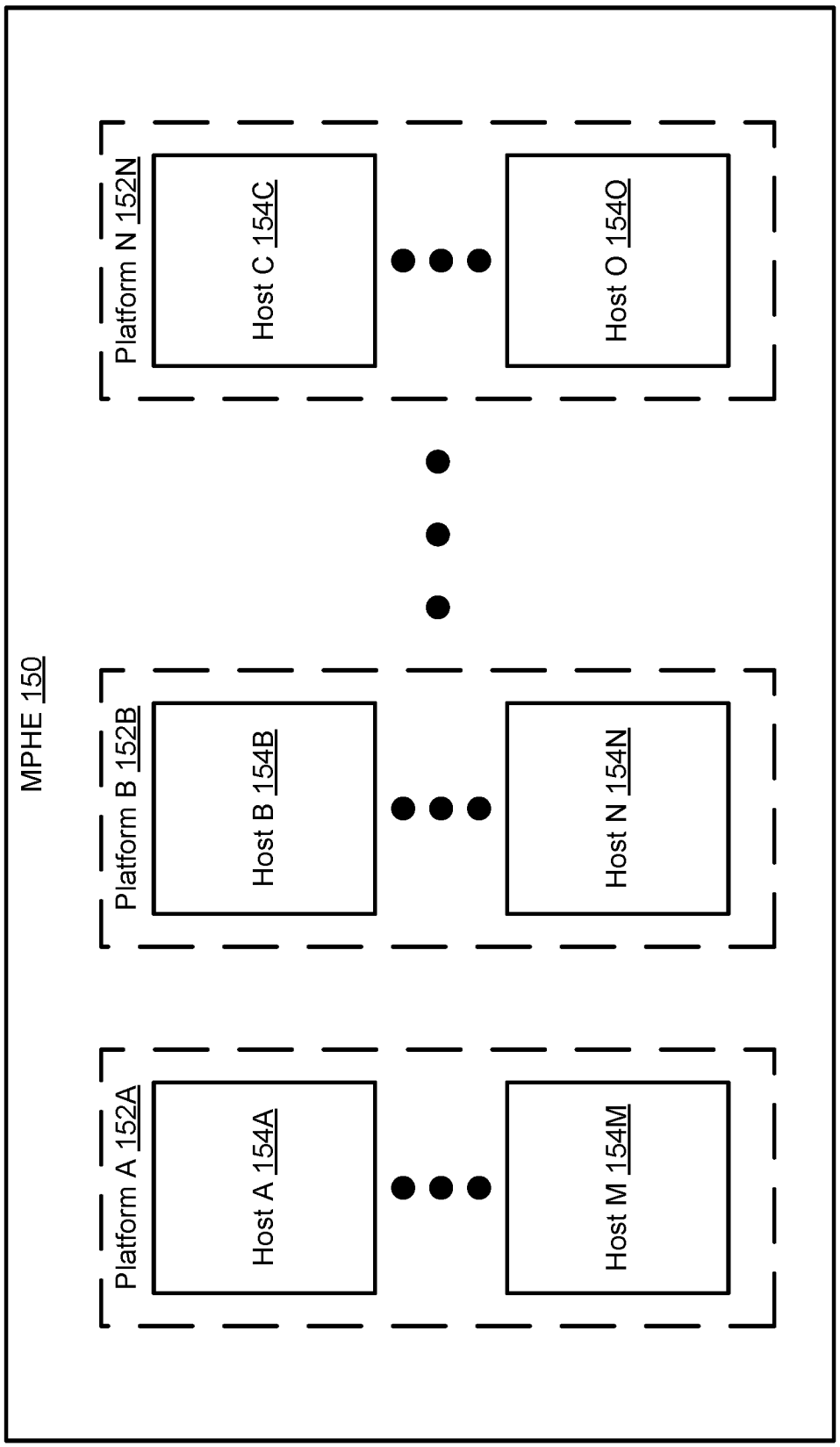
FIG. 1B shows a diagram of a multi-platform host environment in accordance with one or more embodiments disclosed herein.

FIG. 1B shows a diagram of a multi-platform host environment (MPHE) (150) in accordance with one or more embodiments disclosed herein. The MPHE (150) may be an embodiment of the MPHE (150, FIG. 1A) discussed above. As discussed above, the MPHE (150) may include multiple hosts. The MPHE (150) may include other, additional, and/or fewer components without departing from embodiments disclosed herein. Each host may be associated with a platform (e.g., platform A (152A), platform B (152B), and platform N (152N)). As used herein, a platform may refer to one or more hosts that include the same operating system (OS). Therefore, each host in a platform may include different functionalities, implementations, or characteristics based on the OS of the platform. Accordingly, platform A (152A) may include host A (154A) and host M (154M). Platform B (152B) may include host B (154B) and host N (154N). Platform N (152N) may include host C (154C) and host O (154O). Therefore, host A (154A) and host M (154M) each may have the OS of platform A (152A), host B (154B) and host N (154N) each may have the OS of platform B (152B), and host C (154C) and host O (154O) each may have the OS of platform N (152N).

The MPHE (150) may include any quantity of platforms (152A, 152B, 152N) without departing from embodiments disclosed herein. The platforms (152A, 152B, 152N) may each include any quantity of hosts without departing from embodiments disclosed herein. Additionally, each platform may be associated with a different OS. The platforms (152A, 152B, 152N) each may be associated with any appropriate OS without departing from embodiments disclosed herein. The operating systems may include, for example, a Windows operating system, a Linux operating system, a Mac operating system, an Android operating system, etc. Accordingly, as an example, platform A (152A) may include hosts (154A, 154M) that include a Windows OS, platform B (152B) may include hosts (154B, 154N) that include a Linux OS, and so on.

As discussed above, each host (e.g., 154A, 154M, 154B, 154N, 154C, 154O) may include the functionality to perform a backup operation for an NAS asset stored on an NAS node of the NAS system (140) to generate and store a NAS backup in the backup storage (120). Additionally, each host (e.g., 154A, 154M, 154B, 154N, 154C, 154O) may also include the functionality to perform a restoration operation to restore a NAS asset on the NAS system (140, FIG. 1A) using all, or a portion of an NAS backup stored in the backup storage (120). The hosts may include other and/or additional functionalities without departing from embodiments disclosed herein.

In one or more embodiments, each host (e.g., 154A, 154M, 154B, 154N, 154C, 154O) may be implemented using one or more computing devices. A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIGS. 2A-2C. The hosts (e.g., 154A, 154M, 154B, 154N, 154C, 154O) may be implemented using other types of computing devices without departing from embodiments disclosed herein. For additional details regarding computing devices, refer to FIG. 3.

In one or more embodiments, the hosts (e.g., 154A, 154M, 154B, 154N, 154C, 154O) may be implemented using logical devices without departing from embodiments disclosed herein. For example, the hosts (e.g., 154A, 154M, 154B, 154N, 154C, 154O) may include virtual machines that utilize computing resources of any number of physical computing devices to provide the functionality of the hosts (e.g., 154A, 154M, 154B, 154N, 154C, 154O). The hosts (e.g., 154A, 154M, 154B, 154N, 154C, 154O) may be implemented using other types of logical devices without departing from the embodiments disclosed herein. For additional information regarding hosts (e.g., 154A, 154M, 154B, 154N, 154C, 154O), refer to FIG. 1C.

Figure 1C:
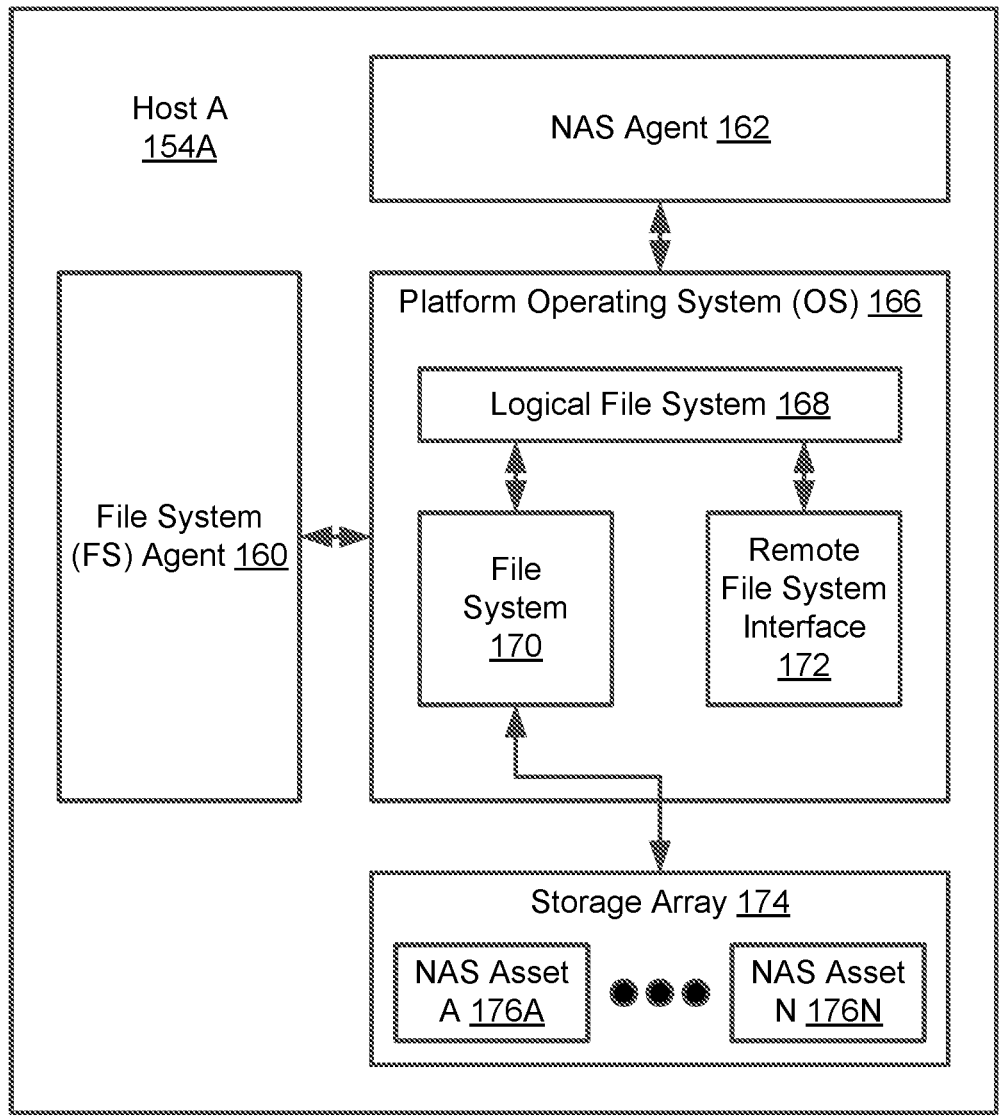
FIG. 1C shows a diagram of a host in accordance with one or more embodiments disclosed herein.

FIG. 1C shows a diagram of a host in accordance with one or more embodiments disclosed herein. The host (154A) may be an embodiment of the hosts (e.g., 154A, 154M, 154B, 154N, 154C, 154O) discussed above in FIG. 1B. To provide the functionality of host A (154A) as discussed above, host A (154A) may include a file system (FS) agent (160), a NAS agent (162), a platform operating system (OS) (166), a logical file system (168), a file system (170), a remote file system interface (172), and a storage array (174). Host A (154A) may include other, additional, and/or fewer components without departing from embodiments disclosed herein. Each of the host A (154A) components is discussed below.

In one or more embodiments, FS agent (160) may refer to a computer program that may execute on the underlying hardware of host A (154A). Specifically, the FS agent (160) may be configured to: (i) store backups in the backup storage (120, FIG. 1A), (ii) obtain backups from the backup storage (120, FIG. 1A), and (iii) store data in NAS system (140, FIG. 1A) using a NAS mount point. The FS agent (160) may include the functionality to perform all, or a portion, of the methods of FIGS. 2A-2C. The FS agent (160) may include other and/or additional functionalities without departing from embodiments disclosed herein. For additional information regarding the functionality of the FS agent (160), refer to FIGS. 2A-2C.

In one or more embodiments, the NAS agent (162) may refer to a computer program that may execute on the underlying hardware of host A (154A). Specifically, the NAS agent (162) may facilitate the generation and removal of NAS mount points. Accordingly, the NAS agent (162) may include the functionality to perform all, or a portion, of the methods of FIGS. 2A-2C). The NAS agent (162) may include other and/or additional functionalities without departing from embodiments disclosed herein. For additional information regarding the functionality of the NAS agent (162), refer to FIGS. 2A-2C.

In one embodiment of the invention, the platform operating system (166) may refer to a computer program that may execute on the underlying hardware of host A (154A). Specifically, the platform operating system (166) may be configured to oversee host A (154A) operations. To that extent, the platform operating system (166) may include functionality to, for example, support fundamental host A (154A) functions; schedule tasks; mediate interactivity between logical (e.g., software) and physical (e.g., hardware) host A (154A) components; allocate host A (154A) resources; and execute or invoke other computer programs executing on host A (154A). One of ordinary skill will appreciate that the platform operating system (166) may perform other functionalities without departing from embodiments disclosed herein.

For example, the platform operating system (166) may facilitate NAS agent (162) interaction with NAS assets stored remotely over the network (e.g., 130, FIG. 1A) in the NAS system (140, FIG. 1A). In facilitating the aforementioned interaction, the platform operating system (166) may implement a logical file system (168). The logical file system (168) may represent a collection of in-memory data structures maintained, by the platform operating system (166), to manage the various accessible NAS assets (176A-176N) data stored locally on host A (154A) and/or remotely on the NAS system (140). Further, the logical file system (168) may expose an application programming interface (API) (not shown) through which the NAS agent (162) and/or the FS agent (160) may manipulate—i.e., via one or more file operations—any granularity of locally and/or remotely stored NAS asset (176A-176N) data. These file operations, requested by the NAS agent (162) and/or the FS agent (160), may subsequently be delivered to the file system (170) or remote file system interface (172) for processing.

In one embodiment of the invention, the file system (170) may represent a physical file system (also referred to as a file system implementation). A physical file system may refer to a collection of subroutines concerned with the physical operation of one or more physical storage devices (described below). The file system (170), in this respect, may be concerned with the physical operation of the storage array (174). Accordingly, the file system (170) may employ storage array (174) device drivers (or firmware) (not shown) to process requested file operations from the NAS agent (162) and/or the FS agent (160). Device drivers enable the file system (170) to manipulate physical storage or disk blocks as appropriate.

In one embodiment of the invention, the remote file system interface (172) may represent a computer program that may execute on the underlying hardware of host A (154A). Specifically, the remote file system interface (172) may be designed and configured to facilitate the access and manipulation of remotely stored data as if the aforementioned data were stored locally on host A (154A). Accordingly, the remote file system interface (172) may, in part, implement or communicate with the NAS system (140, FIG. 1A), which may employ any known protocol (e.g., the network file system (NFS), Server Message Block (SMB), Common Internet File System, etc.). A NAS system may refer to a mechanism through which files (e.g., NAS assets) may be stored and accessed over a network (e.g., 130, FIG. 1A) as discussed above. The invention is not limited to the aforementioned protocols.

In one embodiment of the invention, the storage array (174) may refer to a collection of one or more physical storage devices (not shown) on which various forms of digital data—e.g., one or more NAS assets (176A-176N) (described above)—may be consolidated. Each physical storage device may encompass non-transitory computer readable storage media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the storage array (174) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

Figure 1D:
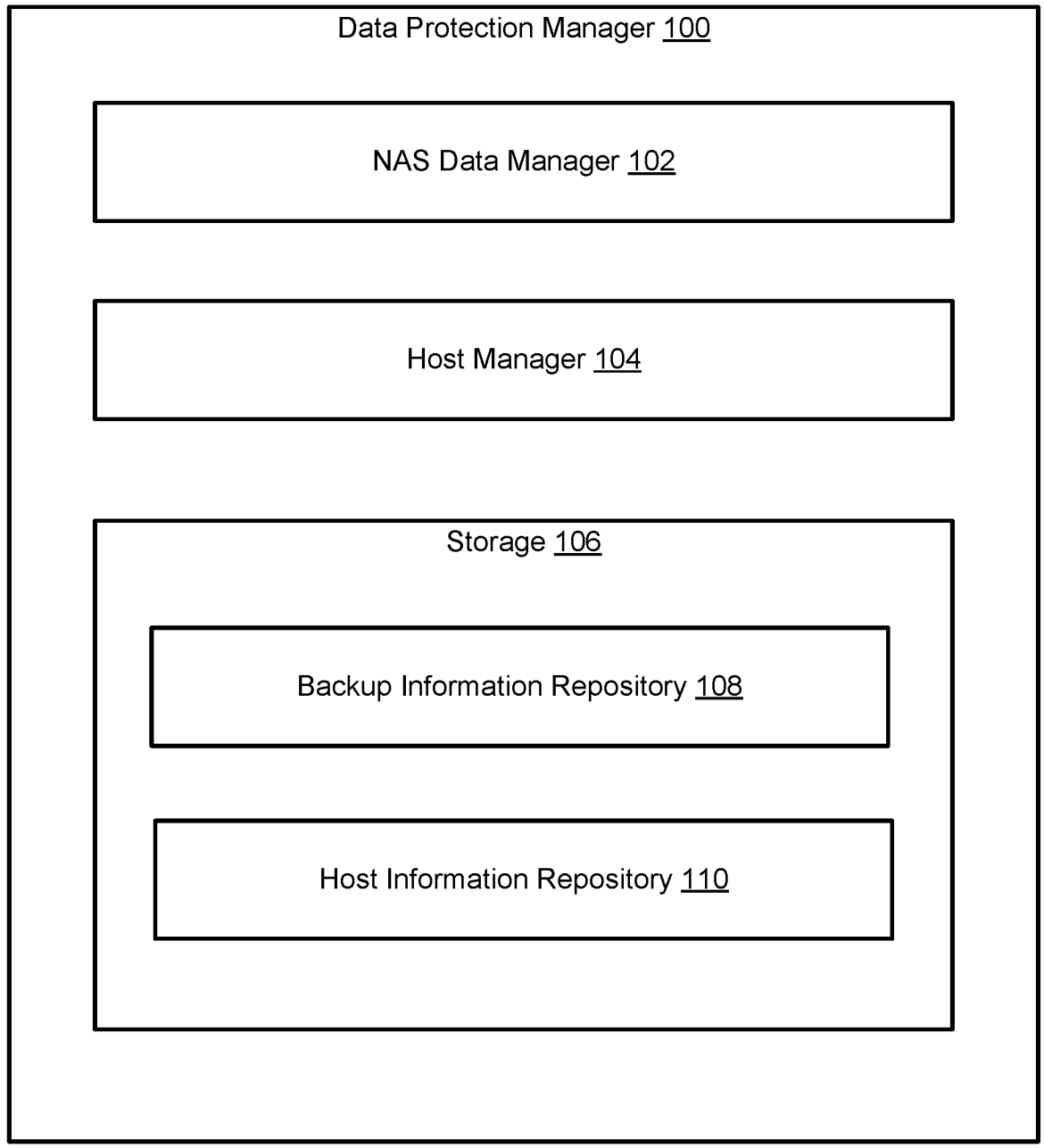
FIG. 1D shows a diagram of a data protection manager in accordance with one or more embodiments disclosed herein.

FIG. 1D shows a diagram of a data protection manager in accordance with one or more embodiments disclosed herein. The data protection manager (100) may be an embodiment of the data protection manager (100) discussed above in FIG. 1A. As discussed above, the data protection manager may include the functionality, or is otherwise configured, to perform data protection management services. To perform the aforementioned services, the data protection manager (100) may include a NAS data manager (102), a host manager (104), and storage (106). The data protection manager (100) may include other, additional, and/or fewer components without departing from embodiments disclosed herein. Each of the aforementioned components of the data protection manager (100) is discussed below.

In one or more embodiments disclosed herein, the NAS data manager (102) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the NAS data manager (102) described throughout this Detailed Description.

In one or more embodiments disclosed herein, the NAS data manager (102) is implemented as computer instructions, e.g., computer code, stored on a storage (e.g., 106) that when executed by a processor of the data protection manager (100) causes the data protection manager (100) to provide the functionality of the NAS data manager (102) described throughout this Detailed Description.

In one or more embodiments, the NAS data manager (102) may include the functionality to, or otherwise be configured to, perform a portion of the aforementioned data protection management services of the data protection manager (100). The portion of the data protection management services performed by the NAS data manager (102) may include (i) initiating backups of NAS assets, (ii) maintaining backup information (discussed below), and (iii) initiating restorations of NAS assets. To perform the portions of the data protection management services, the NAS data manager (102) may obtain user requests and selections through a user interface (e.g., web page user interface, a command-line interface, a graphical user interface, etc.). To perform the portions of the data protection management services, the NAS data manager (102) may also send/obtain requests and information to and from the host manager (104) and hosts of the MPHE (150, FIG. 1A). The NAS data manager (102) may include the functionality to perform all, or a portion, of the methods discussed in FIGS. 2A-2C. The NAS data manager (102) may include other and/or additional functionalities without departing from embodiments disclosed herein. For additional information regarding the functionality of the NAS data manager (102), refer to FIGS. 2A-2C.

In one or more embodiments disclosed herein, the host manager (104) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the host manager (104) described throughout this Detailed Description.

In one or more embodiments disclosed herein, the host manager (104) is implemented as computer instructions, e.g., computer code, stored on a storage (e.g., 106) that when executed by a processor of the data protection manager (100) causes the data protection manager (100) to provide the functionality of the host manager (104) described throughout this Detailed Description.

In one or more embodiments, the host manager (104) may include the functionality to, or otherwise be configured to, perform a portion of the aforementioned data protection management services of the data protection manager (100). The portion of the data protection management services performed by the host manager (104) may include (i) reserving or otherwise allocating host of the MPHE (150, FIG. 1A) to perform a backup operation or a restoration operation, and (ii) maintaining a host information repository (discussed below). To perform the portions of the data protection management services, the host manager (104) may obtain send/obtain requests and information to and from the host manager (104) and hosts of the MPHE (150, FIG. 1A). The host manager (104) may include the functionality to perform all, or a portion, of the methods discussed in FIGS. 2A-2C. The host manager (104) may include other and/or additional functionalities without departing from embodiments disclosed herein. For additional information regarding the functionality of the host manager (104), refer to FIGS. 2A-2C.

In one or more embodiments, the storage (106) may be implemented using one or more volatile or non-volatile storages or any combination thereof. The storage (106) may include the functionality to, or otherwise be configured to, store and provide all, or portions, of information that may be used by the data protection manager components (e.g., 102, 104). The information stored in the storage (106) may include a backup information repository (108) and a host information repository (110). The storage (106) may include other and/or additional information without departing from embodiments disclosed herein. Each of the aforementioned types of information is discussed below.

In one or more embodiments, the backup information repository (108) may refer to one or more data structures that include backup entries. Each backup entry may be associated with a backup stored on the backup storage. Each backup entry may include information associated with the corresponding backup. For example, a backup entry may include a backup identifier associated with the backup, the storage location of the backup in the backup storage (e.g., a pointer, mapping information, logical unit numbers (LUNs), etc.) associated with the backup, backup storage access information associated with the backup storage (e.g., username, password, encryption keys, tokens, etc.), NAS node associated with the NAS asset included in the backup corresponding with the backup entry, an NAS destination path (e.g., file system path) to use for restoration, and NAS system access information (e.g., username, password, encryption keys, tokens, etc.) associated with the backup, a timestamp specifying when the backup was generated, and/or a host identifier associated with the host used to generate the backup. As used herein, an identifier may be a unique combination of bits and/or alphanumeric characters that are associated with and specify a particular thing. The backup entries may include other and/or additional information associated with backups of NAS assets without departing from embodiments disclosed herein.

In one or more embodiments, the host information repository (110) may refer to one or more data structures that include host entries. Each host entry may be associated with a host in the MPHE (150, FIG. 1A). Each host entry may include information associated with the corresponding host. For example, a host entry may include a host identifier, a platform identifier, a platform OS identifier, host access information (e.g., username, password, encryption keys, tokens, etc.), and/or a host workload capacity specifying an amount of available resources in the host. The host entries may include other and/or additional information associated with hosts in the in the MPHE (150, FIG. 1A) without departing from embodiments disclosed herein.

While the data structures mentioned in this Detailed Description are discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while discussed as being stored in the storage (106), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

Figure 2A:
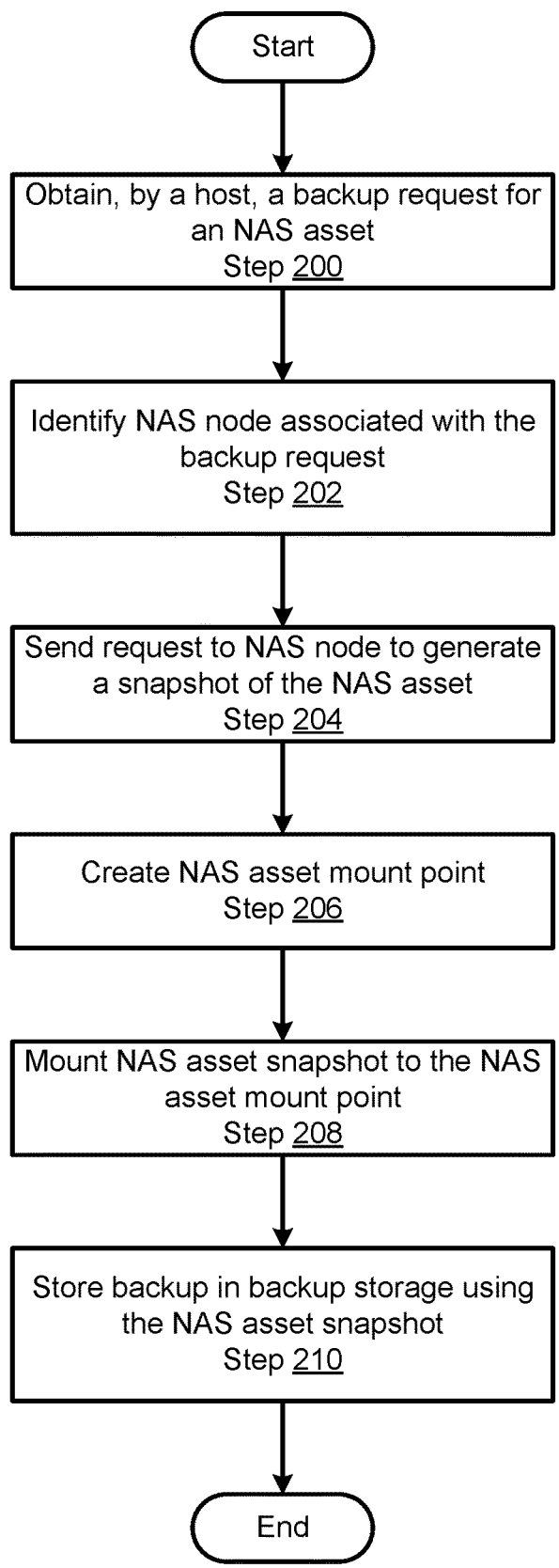
FIG. 2A shows a flowchart of a method for generating a backup of a NAS asset in accordance with one or more embodiments disclosed herein.

FIG. 2A shows a flowchart of a method for generating a backup of a NAS asset in accordance with one or more embodiments disclosed herein. The method shown in FIG. 2A may be performed by, for example, a host (e.g., 154A, FIG. 1B) of the MPHE (150) and/or components therein. Other components of the system in FIGS. 1A-1D may perform all, or a portion, of the method of FIG. 2A without departing from the scope of the embodiments described herein. While FIG. 2A is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 200, a backup request for a NAS asset is obtained. In one or more embodiments, the host may obtain a backup request for an NAS asset from the data protection manager. The data protection manager may send the backup request based on a protection policy that specifies a backup schedule for one or more NAS assets or in response to a backup request obtained from a user. The backup request may include the NAS asset identifier associated with the NAS asset corresponding to the backup request. The backup request may further include the NAS node identifier associated with the NAS node the includes the NAS asset. The backup request may include other and/or additional information without departing from embodiments disclosed herein. The backup request may be obtained using any appropriate method of data transmission without departing from embodiments disclosed herein. For example, the data protection manager may send the backup request as a message including one or more network packets through one or more network devices that operatively connect the data protection manager to the host. The backup request for an NAS asset may be obtained via other and/or additional methods without departing from embodiments disclosed herein.

In Step 202, a NAS node associated with the backup request is identified. As discussed above in Step 200, the backup request may include the NAS node identifier, the stream API request may include NAS node identifier corresponding to the NAS node associated with the backup request. The host may parse the backup request to obtain the NAS node identifier and identify the NAS node associated with the backup request. The NAS node associated with the backup request may be identified via other and/or additional methods without departing from embodiments disclosed herein.

In Step 204, a request is sent to the NAS node to generate a snapshot of the NAS asset. In one or more embodiments, an NAS agent of the host may then send a request to the NAS node to generate a snapshot of the NAS asset. The request may include the NAS asset identifier. The request may include other and/or additional information without departing from embodiments disclosed herein. The snapshot request may be sent using any appropriate method of data transmission without departing from embodiments disclosed herein. For example, the NAS agent may send the snapshot request as a message including one or more network packets through one or more network devices that operatively connect the NAS agent to the NAS node. The request may be sent to the NAS node to generate a snapshot of the NAS asset via other and/or additional methods without departing from embodiments disclosed herein.

In Step 206, a NAS asset mount point is created. In one or more embodiments, the NAS agent may check the file system of the host to identify any available mount points. If there is an available mount point, then the NAS may create the NAS asset mount point by selecting and allocating the available mount point. If there is no available mount point, then the NAS agent may generate a new folder on the system drive of host and select the new folder as the NAS asset mount point. The NAS asset mount point may be created via other and/or additional methods without departing from embodiments disclosed herein.

In Step 208, the NAS asset snapshot is mounted to the NAS asset mount point. In one or more embodiments, the NAS agent mounts the snapshot of the NAS asset to the NAS asset mount point. As used herein, a mount point may refer to pathname of directory or folder on which the NAS asset snapshot is mounted. The NAS asset snapshot may be mounted to the NAS asset mount point via other and/or additional methods without departing from embodiments disclosed herein.

In Step 210, a backup is stored in the backup storage using the NAS asset snapshot. In one or more embodiments, the FS agent of the host may then send the NAS asset snapshot to the backup storage to generate and store a backup of the NAS asset snapshot. The NAS asset snapshot may include the NAS asset data and NAS asset metadata in its entirety. The NAS asset metadata may include all platform specific metadata (e.g., access control lists, platform specific filenames/identifiers, etc.). By including the NAS asset metadata in the backup along with the NAS asset data, the backup may be platform agnostic. In other words, different parts of the NAS asset metadata may be used by different platforms, enabling cross platform restorations. In one or more embodiments, the FS agent may generate, or obtain from the backup storage, backup information associated with the backup. The FS agent may send the backup information to the data protection manager to so that the backup information is stored in the backup information repository. A backup may be stored in the backup storage using the NAS asset snapshot via other and/or additional methods without departing from embodiments disclosed herein.

In one or more embodiments disclosed herein, the method ends following Step 210.

Figure 2B:
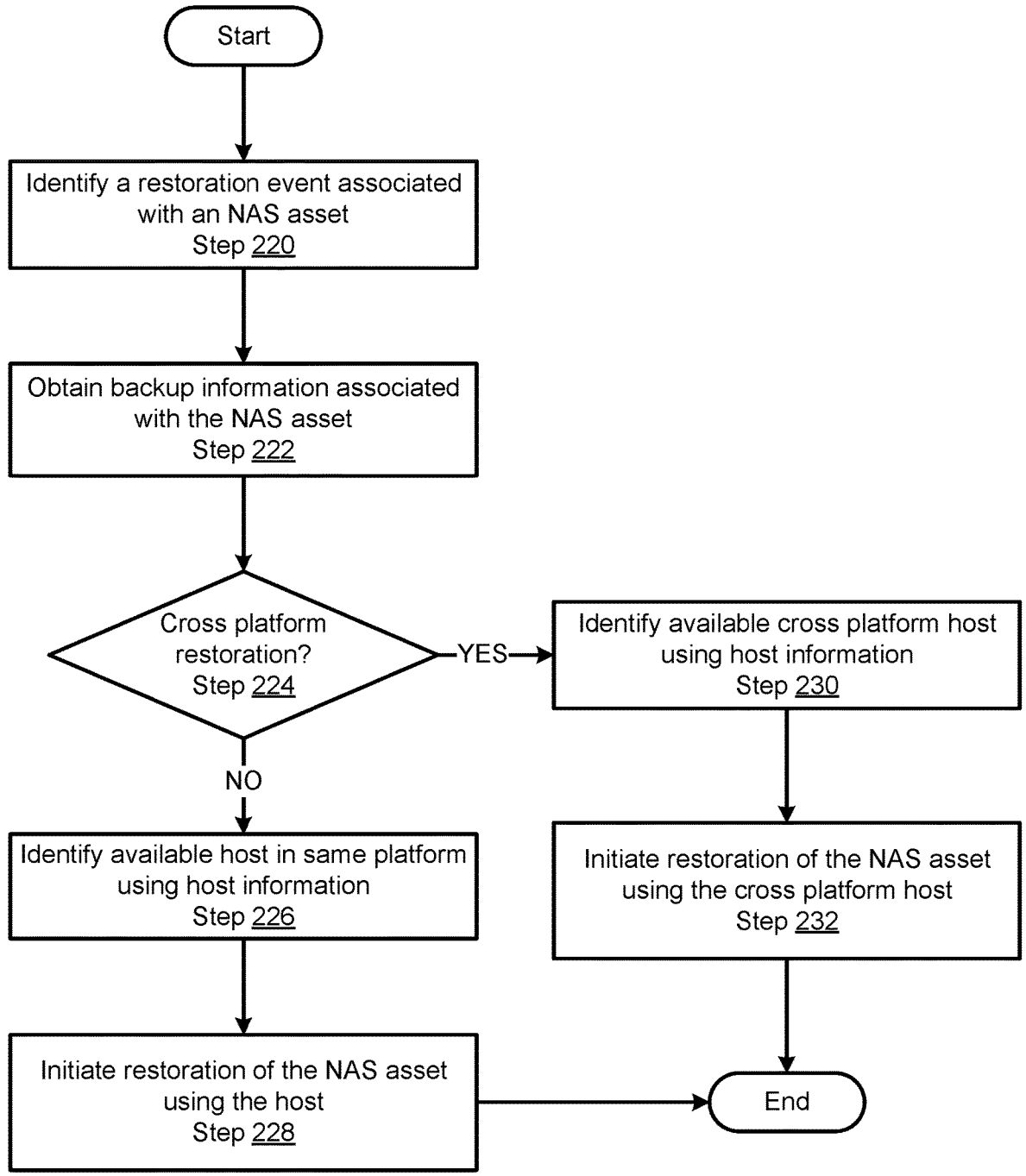
FIG. 2B shows a flowchart of a method for performing data protection management services in accordance with one or more embodiments disclosed herein.

FIG. 2B shows a flowchart of a method for performing data protection management services in accordance with one or more embodiments disclosed herein. The method shown in FIG. 2B may be performed by, for example, a data protection manager (e.g., 100, FIG. 1A) and/or components therein. Other components of the system in FIGS. 1A-1D may perform all, or a portion, of the method of FIG. 2B without departing from the scope of the embodiments described herein. While FIG. 2B is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 220, a restoration event associated with a NAS asset is identified. In one or more embodiments, the NAS data manager of the data protection manager obtains a registration request from a user. In one embodiment, the request is obtained from a client (not shown in FIG. 1A) used by the user. The request may be obtained using any appropriate method of data transmission without departing from embodiments disclosed herein. The request may include user selections. The request may include other and/or additional information associated with the restoration of the NAS asset without departing from embodiments disclosed herein. The NAS data manager may identify receipt of the registration request as the restoration event associated with a NAS asset.

In another embodiment, a user may directly submit user selections initiating a restoration of an NAS asset. The user may submit the user selections through a user interface (e.g., a graphical user interface, a command-line interface, a web page interface, etc.). The user interface may provide a view of all, or a portion of the backup information included in the backup information repository and the host information included in the host information repository. The user may submit his user selections by, for example, pushing one or more keys on a keyboard, clicking one or more icons, entering one or more commands, etc. The NAS data manager may identify the receipt of the receipt of the user selections as the restoration event associated with the NAS asset. The restoration event associated with the NAS asset may be identified via other and/or additional methods without departing from embodiments disclosed herein.

In Step 222, backup information associated with the NAS asset is obtained. In one or more embodiments, the user selections associated with the restoration event may include a NAS asset identifier and/or a backup identifier. In one or more embodiments, the NAS data manager may obtain backup information from the most recent backup entry of the backup information repository associated with the NAS asset identifier and/or the backup identifier. The NAS data manager may identify the backup entry by matching the NAS asset identifier and/or the backup identifier to the backup identifiers and/or the NAS asset identifiers included in the backup entries. After identifying the relevant backup entry, the NAS data manager may obtain the backup information included in the backup entry. The backup information associated with the NAS asset may be obtained via other and/or additional methods without departing from embodiments disclosed herein.

In Step 224, a determination is made as to whether the restoration is a cross platform restoration. In one embodiment, one of the user selections may specify that the user desires the restoration to be a cross platform restoration. If the NAS data manager identifies such a user selection is associated with the restoration event, then the NAS data manager may determine that the restoration is a cross platform restoration. If the NAS data manager does not identify such a user selection is associated with the restoration event, then the NAS data manager may determine that the restoration is not a cross platform restoration.

In another embodiment, the user selections may specify a cross platform restoration is allowed by the user. In such an embodiment, the user selections may further specify a host of the MPHE to perform the restoration. The NAS data manager may then check the backup information associated with the NAS asset to determine whether the host used to generate the backup is in the same platform as the host selected by the user to perform the restoration. If the platform of the host used to generate the backup is the same as the platform of the host selected for restoration, then the NAS data manager may determine that the restoration is not a cross platform restoration. If the platform of the host used to generate the backup is not the same as the platform of the host selected for restoration, then the NAS data manager may determine that the restoration is a cross platform restoration.

In yet another embodiment, the user selections may specify a cross platform restoration is allowed by the user. The NAS data manager may then check the backup information to identify the platform of the host used to generate the backup. The NAS data manager may then check for platform restoration restrictions associated with NAS asset or the backup using the backup information. The platform restoration restrictions may include, a NAS asset identifier or file name exceeds a limit allowed by the OS associated with the platform used to generate the backup, the NAS asset identifier or file name includes characters not allowed (e.g., non-English characters) by the OS associated with the platform used to generate the backup, and/or other and/or additional types of platform restoration restrictions. If the NAS data manager identifies a platform restoration restriction associated with the backup, then the NAS data manager may determine the restoration is a cross platform restoration out of necessity because a non-cross platform backup would fail. If the NAS data manager does not identify a platform restoration restriction associated with the backup, then the NAS data manager may determine the restoration is a not a cross platform restoration.

In yet another embodiment, the user selections may specify a cross platform restoration is allowed by the user. The user selection may further specify that a host initially desires a non-cross platform restoration. The NAS data manager may then request the host manager to check for available host in the same platform as the host used to generate the backup. The host manager may use the host information and the backup information to compare the backup size with the current capacity of each of the hosts to check if such a host is available in the platform. If the host manager indicates that no host in the platform is currently available to perform the restoration, then the NAS data manager may determine that the restoration is a cross platform restoration to avoid delays waiting for a host of the same platform to become available. If the host manager indicates that a host in the platform is currently available to perform the restoration, then the NAS data manager may determine that the restoration is not a cross platform restoration.

The determination as to whether the restoration is a cross platform restoration may be made via other and/or additional methods without departing from embodiments disclosed herein.

In one or more embodiments disclosed herein, if it is determined that the restoration is a cross platform restoration, then the method proceeds to Step 230. In one or more embodiments disclosed herein, if it is determined that the restoration is not a cross platform restoration, then the method proceeds to Step 226.

In Step 226, an available host is identified using host information. In one or more embodiments, the host manager may identify all hosts entries in the host information repository associated with the same platform as the host used to generate the backup. The host manager may then use the host information and the backup information to compare the backup size with the current capacity of each of the hosts to check if such a host is available in the platform to perform a restoration using the backup. If a host is available, then the host manager may identify the first available host it finds. The available host may be identified using host information via other and/or additional methods without departing from embodiments disclosed herein.

In Step 228, a restoration of the NAS asset is initiated using the host. In one or more embodiments, the NAS data manager may send a message to the identified available host. The message may include a request to perform a restoration of a NAS asset using the backup stored in the backup storage. The message may further include the backup information associated with the backup and the NAS node information included in the user selection. The message may include other and/or additional information associated with the restoration of the NAS asset without departing from embodiments disclosed herein. In response to obtaining the request, the host may perform a non-cross platform restoration by restoring the NAS asset in the NAS node using the backup. The message may be sent using any appropriate method of data transmission without departing from embodiments disclosed herein. For example, the message may be sent as one or more network packets through one or more network devices that operatively connect the NAS data manager and the host. The restoration of the NAS asset may be initiated using the host via other and/or additional methods without departing from embodiments disclosed herein.

In one or more embodiments disclosed herein, the method ends following Step 228.

In Step 230, an available cross platform host is identified based on the backup information. In one or more embodiments, the host manager may identify all hosts entries in the host information repository associated with a different platform as the host used to generate the backup. The host manager may further identify hosts associated with one or more platforms specified by the user selections. The host manager may then use the host information and the backup information to compare the backup size with the current capacity of each of the identified hosts to check one of the identified hosts is available to perform a restoration using the backup. If a host is available, then the host manager may identify the first available host it finds. The available cross platform host may be identified using host information via other and/or additional methods without departing from embodiments disclosed herein.

In Step 232, restoration of the NAS asset using the cross platform host and the backup information is initiated. In one or more embodiments, the NAS data manager may send a message to the identified available host. The message may include a request to perform a restoration of a NAS asset using the backup stored in the backup storage. The message may further include the backup information associated with the backup and the NAS node information included in the user selection. The message may include other and/or additional information associated with the restoration of the NAS asset without departing from embodiments disclosed herein. In response to obtaining the request, the host may perform a cross platform restoration by restoring the NAS asset in the NAS node using the backup. The message may be sent using any appropriate method of data transmission without departing from embodiments disclosed herein. For example, the message may be sent as one or more network packets through one or more network devices that operatively connect the NAS data manager and the host. The restoration of the NAS asset may be initiated using the host via other and/or additional methods without departing from embodiments disclosed herein. For additional information regarding performing a cross platform restoration request, refer to FIG. 2C.

In one or more embodiments disclosed herein, the method ends following Step 232.

Figure 2C:
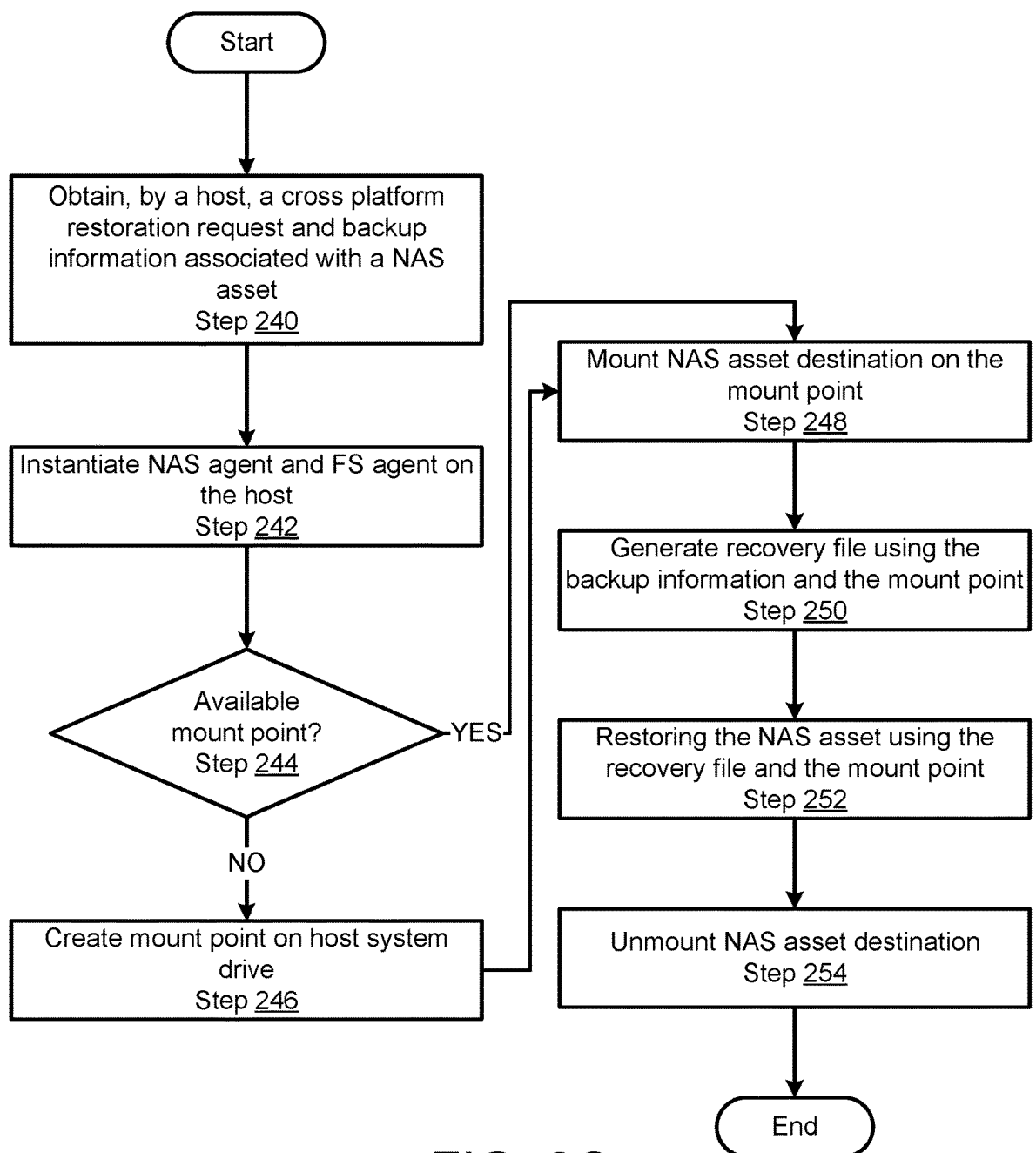
FIG. 2C shows a flowchart of a method for performing a cross platform restoration of a NAS asset in accordance with one or more embodiments disclosed herein.

FIG. 2C shows a flowchart of a method for performing a cross platform restoration of a NAS asset in accordance with one or more embodiments disclosed herein. The method shown in FIG. 2C may be performed by, for example, a host (e.g., 154A, FIG. 1B) and/or components therein. Other components of the system in FIGS. 1A-1D may perform all, or a portion, of the method of FIG. 2C without departing from the scope of the embodiments described herein. While FIG. 2C is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 240, a cross platform restoration request and backup information associated with a NAS asset are obtained by a host. In one or more embodiments, the NAS data manager may send a message to the host. The message may include a request to perform a cross-platform restoration of a NAS asset using the backup stored in the backup storage. The message may further include the backup information associated with the backup and NAS node information included in the user selection. The message may include other and/or additional information associated with the restoration of the NAS asset without departing from embodiments disclosed herein. The message may be sent using any appropriate method of data transmission without departing from embodiments disclosed herein. For example, the message may be sent as one or more network packets through one or more network devices that operatively connect the NAS data manager and the host. The cross platform restoration request and backup information associated with the NAS asset may be obtained by a host via other and/or additional methods without departing from embodiments disclosed herein.

In Step 242, a NAS agent and a FS agent are instantiated on the host. In one or more embodiments, the host may instantiate the NAS agent and/or the FS agent. The host may use any appropriate method of instantiation to instantiate the NAS agent and/or the FS agent. For example, the host may instantiate the NAS agent and the FS agent using binaries stored in storage of the host or obtained from the NAS data manager. In one or more embodiments, if both the NAS agent and FS agent are executing on the host prior to Step 242, then Step 242 may be skipped. The NAS agent and FS agent may be instantiated on the host via other and/or additional methods without departing from embodiments disclosed herein.

In Step 244, a determination is made as to whether a mount point is available. In one or more embodiments, the NAS agent may check the file system of the host to identify any available mount points. If no mount points are included in the host file system, then the NAS agent may determine that there is not an available mount point. If a mount point is included in the host file system, then the NAS agent may determine that there is an available mount point. The determination as to whether a mount point is available may be made via other and/or additional methods without departing from embodiments disclosed herein.

In Step 246, a mount point is created on the host system drive. If there is no available mount point, then the NAS agent may generate a new folder on the system drive of host and select the new folder as the NAS asset mount point. The mount point may be created on the host system drive via other and/or additional methods without departing from embodiments disclosed herein.

In Step 248, the NAS asset destination is mounted on the mount point. In one or more embodiments, the NAS agent may then use the NAS node information to mount the NAS node (i.e., the NAS asset destination) on the mount point. The NAS node information may include the NAS node identifier, NAS node access information (e.g., username, password, encryption keys, tokens, etc.). The NAS asset destination may be mounted on the mount point via other and/or additional methods without departing from embodiments disclosed herein.

In Step 250, a recovery file is generated using the backup information and the mount point. In one or more embodiments, the NAS agent may generate the recovery file. The recovery file may include the backup identifier, the backup storage information associated with the backup, the mount point, and a quantity of parallel streams that may be used to perform the restoration. The recovery file may be used by the FS agent to perform the cross platform restoration. The recovery file may include other and/or additional information associated with the cross platform recovery without departing from embodiments disclosed herein.

In Step 252, the NAS asset is restored using the recovery file and the mount point. In one or more embodiments, the FS agent may restore the NAS asset. The FS agent may stream the backup to the mount point using the recovery file. As a result NAS asset data included in the backup is written to the NAS node to restore the NAS asset. The NAS asset may be restored using the recovery file and the mount point via other and/or additional methods without departing from embodiments disclosed herein.

In Step 254, the NAS asset destination is unmounted. In one or more embodiments, after the cross platform restoration is complete, then the NAS agent may unmount the NAS asset destination. The NAS agent may unmount the NAS asset destination by deleting the folder in the system drive used as the mount. The NAS asset destination may be unmounted via other and/or additional methods without departing from embodiments disclosed herein.

In one or more embodiments disclosed herein, the method ends following Step 254.

As discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an entity that is programmed to, or configured to, perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for performing data protection services, comprising:
    identifying a restoration event associated with a network attached storage (NAS) asset stored in a backup storage;
    obtaining backup information associated with the NAS asset;
    making a determination that the restoration is associated with cross platform restoration; and
    in response to the determination:
        identifying an available cross platform host of a multi-platform host environment (MPHE) using host information; and
        initiating restoration of the NAS asset using the cross platform host.

2. The method of claim 1, further comprising:
    after the initiating:
    obtaining, by the cross platform host, a cross platform restoration request and backup information associated with the asset backup, wherein the NAS asset backup was generated using a second host of the MPHE;
    in response to obtaining the cross platform restoration request:
        creating a mount point associated with the NAS asset backup;
        mounting, using the backup information, an NAS asset destination associated with the NAS asset backup on the mount point;
        generating a recovery file using the backup information; and
        restoring the NAS asset using the recovery file, the mount point, and the NAS asset backup.

3. The method of claim 2, wherein:
    the cross platform host is associated with a first platform of the MPHE; and
    the second host is associated with a second platform of the MPHE.

4. The method of claim 2, wherein:
    the cross platform host comprises a Windows operating system; and
    the second host comprises a Linux operating system.

5. The method of claim 2, wherein restoring the NAS asset using the recovery file, the mount point, and the NAS asset backup comprises:
    streaming, using the mount point and the recovery file, NAS asset backup data stored in a backup storage to the NAS asset destination in an NAS system.

6. The method of claim 2, wherein the NAS asset comprises:
    a folder; or
    a file.

7. The method of claim 2, wherein the backup information comprises:
    a backup identifier associated with the NAS asset backup;
    a backup storage identifier associated with the NAS asset backup;
    the NAS asset destination; and
    credentials associated with the NAS asset destination.

8. The method of claim 7, wherein the recovery file comprises:
    the backup identifier;
    the backup storage identifier;
    the mount point; and
    restoration parameters.

9. A non-transitory computer readable medium comprising computer readable program code, which when executed by a computer processor enables the computer processor to perform a method for performing data protection services, the method comprising:
    identifying a restoration event associated with a network attached storage (NAS) asset stored in a backup storage;
    obtaining backup information associated with the NAS asset;
    making a determination that the restoration is associated with cross platform restoration; and
    in response to the determination:
        identifying an available cross platform host of a multi-platform host environment (MPHE) using host information; and initiating restoration of the NAS asset using the cross platform host.

10. The non-transitory computer readable medium of claim 9, further comprising:
after the initiating:
obtaining, by the cross platform host, a cross platform restoration request and backup information associated with the asset backup, wherein the NAS asset backup was generated using a second host of the MPHE;
in response to obtaining the cross platform restoration request:
creating a mount point associated with the NAS asset backup;
mounting, using the backup information, an NAS asset destination associated with the NAS asset backup on the mount point;
generating a recovery file using the backup information; and
restoring the NAS asset using the recovery file, the mount point, and the NAS asset backup.

11. The non-transitory computer readable medium of claim 10, wherein:
the cross platform host is associated with a first platform of the MPHE; and
the second host is associated with a second platform of the MPHE.

12. The non-transitory computer readable medium of claim 10, wherein:
the cross platform host comprises a Windows operating system; and
the second host comprises a Linux operating system.

13. The non-transitory computer readable medium of claim 10, wherein restoring the NAS asset using the recovery file, the mount point, and the NAS asset backup comprises:
streaming, using the mount point and the recovery file, NAS asset backup data stored in a backup storage to the NAS asset destination in an NAS system.

14. The non-transitory computer readable medium of claim 10, wherein the NAS asset comprises:
a folder; or
a file.

15. The non-transitory computer readable medium of claim 10, wherein the backup information comprises:
a backup identifier associated with the NAS asset backup;
a backup storage identifier associated with the NAS asset backup;
the NAS asset destination; and
credentials associated with the NAS asset destination.

16. The non-transitory computer readable medium of claim 15, wherein the recovery file comprises:
the backup identifier;
the backup storage identifier;
the mount point; and
restoration parameters.

17. A system for performing data protection services, comprising;
a processor;
a data protection manager, which when executed by the processor performs a method, the method comprising:
identifying a restoration event associated with a network attached storage (NAS) asset stored in a backup storage;
obtaining backup information associated with the NAS asset;
making a determination that the restoration is associated with cross platform restoration; and
in response to the determination;
identifying an available cross platform host of a multi-platform host environment (MPHE) using host information; and
initiating restoration of the NAS asset using the cross platform host.

18. The system of claim 17, further comprising:
after the initiating:
obtaining, by the cross platform host, a cross platform restoration request and backup information associated with the asset backup, wherein the NAS asset backup was generated using a second host of the MPHE;
in response to obtaining the cross platform restoration request:
creating a mount point associated with the NAS asset backup;
mounting, using the backup information, an NAS asset destination associated with the NAS asset backup on the mount point;
generating a recovery file using the backup information; and
restoring the NAS asset using the recovery file, the mount point, and the NAS asset backup.

19. The system of claim 18, wherein:
the cross platform host is associated with a first platform of the MPHE; and
the second host is associated with a second platform of the MPHE.

20. The system of claim 18, wherein:
the cross platform host comprises a Windows operating system; and
the second host comprises a Linux operating system.

* * * * *